US009111014B1

(12) United States Patent
Brown et al.

(10) Patent No.: US 9,111,014 B1
(45) Date of Patent: Aug. 18, 2015

(54) RULE BUILDER FOR DATA PROCESSING

(75) Inventors: Michael G. Brown, Seattle, WA (US); Yu Pan, Bothell, WA (US); Abhijit S. Tambe, Seattle, WA (US); Joanna K. Wiebe, Vashon, WA (US); Anne M. Siddall, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 584 days.

(21) Appl. No.: 13/345,217

(22) Filed: Jan. 6, 2012

(51) Int. Cl.
*G06F 17/30* (2006.01)
*G06F 3/048* (2013.01)

(52) U.S. Cl.
CPC .......... *G06F 17/30985* (2013.01); *G06F 3/048* (2013.01); *G06F 17/3064* (2013.01)

(58) Field of Classification Search
CPC ........... G06K 9/00442; G06K 9/6253–9/6254; G06F 17/27; G06F 17/2705; G06F 17/272; Y10S 707/99943; Y10S 707/99933–707/99936
USPC ....................................................... 715/738
See application file for complete search history.

(56) References Cited

U.S. PATENT DOCUMENTS

| | | | | |
|---|---|---|---|---|
| 5,864,789 | A * | 1/1999 | Lieberman et al. ............... | 704/9 |
| 7,912,828 | B2 * | 3/2011 | Bonnet et al. .................. | 707/706 |
| 7,958,164 | B2 * | 6/2011 | Ivanov et al. ................. | 707/805 |
| 2004/0210573 | A1 * | 10/2004 | Abe et al. ........................... | 707/5 |
| 2005/0027717 | A1 * | 2/2005 | Koudas et al. ................ | 707/100 |
| 2007/0078872 | A1 * | 4/2007 | Cohen ........................... | 707/101 |
| 2007/0214134 | A1 * | 9/2007 | Haselden et al. ................. | 707/6 |
| 2009/0024951 | A1 * | 1/2009 | Zeringue et al. ............. | 715/772 |
| 2009/0043714 | A1 * | 2/2009 | Zhao et al. ...................... | 706/11 |
| 2011/0213742 | A1 * | 9/2011 | Lemmond et al. .............. | 706/13 |
| 2012/0158745 | A1 * | 6/2012 | Gorelik et al. ................ | 707/748 |
| 2013/0006610 | A1 * | 1/2013 | Quadracci et al. ................ | 704/9 |

OTHER PUBLICATIONS

"Online regular expression generator" by Nikos Vaggalis, dated Nov. 28, 2011, retrieved from Internet Archive Wayback crawl of Nov. 30, 2011 of http://i-programmer.info/news/90-tools/3398-online-regular-expression-generator.html.*

Reg ExMagic Manual version 1.2, dated Mar. 14, 2011, retrieved from Wayback Machine crawl of Nov. 3, 2011 from http://web.archive.org/web/20111103113043/http://www.regexmagic.com/manual.html.*

* cited by examiner

*Primary Examiner* — Tuyetlien Tran
*Assistant Examiner* — Patrick Ramsey
(74) *Attorney, Agent, or Firm* — Thomas | Horstemeyer, LLP

(57) ABSTRACT

Disclosed are various embodiments for a rule builder for data processing. A proper subset of a set of strings is selected. A first user interface is generated that is configured to present the proper subset of the set of strings. The first user interface is further configured to obtain multiple substring selections corresponding to each one of the proper subset of the set of strings. One or more selection patterns are identified based at least in part on the corresponding substring selections. A second user interface is generated that is configured to present the selection patterns for user verification.

23 Claims, 8 Drawing Sheets

RULE BUILDER FOR DATA PROCESSING

BACKGROUND

A common problem in computing involves transforming data stored in one format into another format. Different systems may employ different data formats. For example, data may be organized into a table of rows and columns, where each row corresponds to an instance of a data object and each column corresponds to a respective attribute for the data object. Portions of data stored in one column according to one data format may be extracted and stored in another column in order to conform with another data format. Such extraction may be performed manually, with the user selecting each individual data element portion to be extracted.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure introduces a rule builder for use in extracting, transforming, identifying, or otherwise processing data. Manual data extraction is labor intensive and may be cost prohibitive for large data sets. Automatic data extraction may be an option if the data extraction follows a pattern that may be expressed as a rule or combination of rules, such as, for example, regular expressions. However, regular expressions are notoriously challenging for novices to master. Further, different regular expression systems may be incompatible or employ different syntaxes (e.g., Portable Operating System Interface for Unix (POSIX) regular expressions versus Perl regular expressions). A user who is uploading or otherwise processing a data set may neither have the time nor the inclination to learn regular expressions in general or a particular syntax of regular expressions.

Various embodiments of the present disclosure provide user interfaces for users to create data processing rules for selecting data. Such rules may be used to identify data, extract data, transform data, and so on. In various embodiments, a user interface renders a subset of strings taken from a data set. The user then selects portions from the strings corresponding to the target data. A pattern recognition engine analyzes the selections to determine one or more patterns or rules that may be employed to select the same target data. The user interface then provides feedback to the user, including a description of one or more identified patterns. The user may choose to apply one or more of the identified rules automatically to all members of the data set. In the following discussion, a general description of the system and its components is provided, followed by a discussion of the operation of the same.

Figure 1:
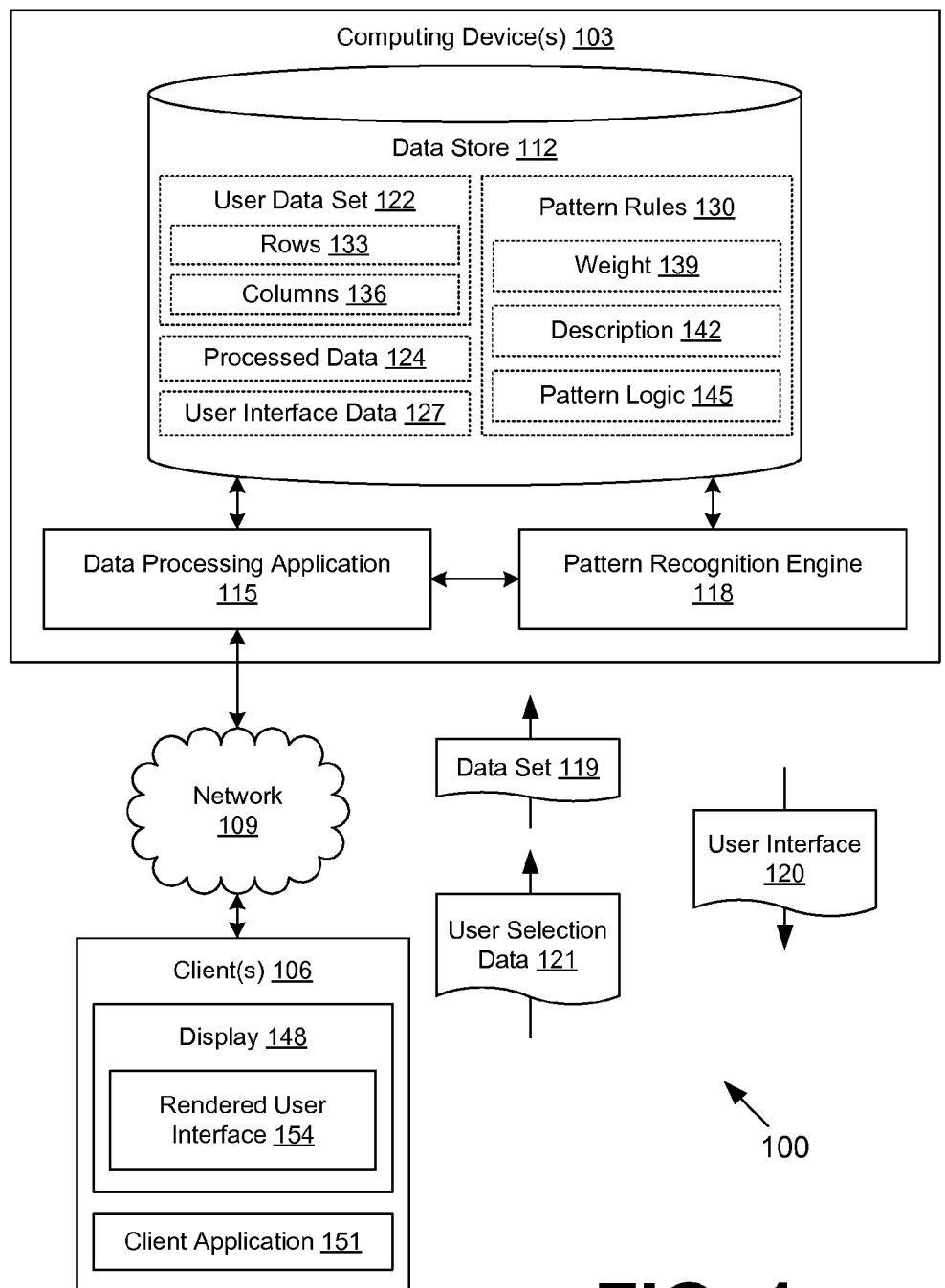
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a data processing application 115, a pattern recognition engine 118, and other applications, services, processes, systems, engines, or functionality not discussed in detail herein. The data processing application 115 is executed to obtain a data set 119 and to generate user interfaces 120 that enable a user at a client 106 to select substrings from sample strings taken from the data set 119. The data processing application 115 is configured to obtain user selection data 121 indicating the selected substrings from the client 106. From the selected substrings, the pattern recognition engine 118 identifies selection patterns. The data processing application 115 then presents the identified selection patterns through a user interface 120 for user verification. Upon user verification of a selection pattern, the data processing application 115 may be configured to process the data set 119 using the selection pattern.

The data stored in the data store 112 includes, for example, a user data set 122, processed data 124, user interface data 127, pattern rules 130, and potentially other data. The user data set 122 corresponds to a data set 119 that has been obtained from a user. For example, the user data set 122 may be uploaded by a client 106 to the computing device 103 or downloaded by the computing device 103 from another server.

The user data set 122 includes a plurality of strings. The term "string" as used herein refers to a character string, or a sequence of characters. The term "substring" as used herein refers to a portion of a string. In some embodiments, a user data set 122 may be organized in a tabular format having multiple rows 133 and multiple columns 136. For example, each column 136 may correspond to a specific attribute for each of the rows 133. As non-limiting examples, the user data set 122 may correspond to a spreadsheet, a delimited text file, a table from a relational database system, a listing of strings, and/or other types of data sets 119.

The processed data 124 corresponds to a version of the user data set 122 that has been processed at least in part according to a selection pattern. To this end, the processed data 124 may correspond to imported data that meets various data formatting or content criteria. The user interface data 127 includes data that may be used to generate the user interfaces 120. In one embodiment, the user interfaces 120 comprise network pages, such as web pages or other forms of network content. Where the user interfaces 120 comprise network pages, the user interface data 127 may include code (e.g., hypertext markup language (HTML), cascading style sheets (CSS), extensible markup language (XML), etc.), templates, text, images, audio, video, applets, and so on.

The pattern rules 130 correspond to a collection of rules that may be employed by the pattern recognition engine 118 to identify one or more selection patterns from user selections of substrings. Each pattern rule 130 may be associated, for example, with a weight 139, a description 142, pattern logic 145, and/or other data. The weight 139 is used in ranking multiple selection patterns that may be identified. As a non-limiting example, a user may select a particular pattern of five characters at the end of a string, which may either be identified as the same five characters (i.e., the content) or the last five characters in a string (i.e., the relative location). A pattern rule 130 relating to the content may have a greater weight 139 than a pattern rule 130 relating to the relative location in a string because it may be more likely that the user was selecting according to the content versus the location.

The description 142 of the pattern rule 130 may correspond to a textual description of an identified pattern that may be included in a user interface 120. As a non-limiting example, a description of a pattern rule 130 relating to the selection of the last five characters of a string may be "last five characters of each string." The pattern logic 145 may correspond to code or logic for matching, extracting, or otherwise processing data according to the selection pattern identified by the pattern rule 130. In one embodiment, the pattern logic 145 corresponds to regular expression code.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 148. The display 148 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a client application 151 and/or other applications. The client application 151 is executed to send the data set 119 to the data processing application 115, to obtain data encoding user interfaces 120, and to send user selection data 121 to the data processing application 115. The client application 151 also renders a rendered user interface 154 corresponding to the user interface 120 on the display 148. In one embodiment, the client application 151 includes a browser, and the user interface 120 comprises a network page. The client 106 may be configured to execute applications beyond the client application 151 such as, for example, browser applications, mobile applications, email applications, instant message applications, and/or other applications.

Next, a general description of the operation of the various components of the networked environment 100 is provided. To begin, a data set 119 is stored in the computing device 103 as a user data set 122. The user data set 122 corresponds to a collection of strings, which may be organized into rows 133 and columns 136. Although row/column organization is described, it is understood that the strings may be organized in a multitude of ways. The data processing application 115 is configured to generate a user interface 120 that presents a random subset of strings taken from the user data set 122. The subset of strings may correspond to multiple subsets which are taken from multiple columns 136 selected by the user. The user interface 120 is sent to the client 106 and rendered on the display 148 by the client application 151.

The user is then able to make selections relative to the subset(s). As non-limiting examples, the user may highlight the last four characters, the first five characters, a particular word, the second word from the left, all characters to the right of a hyphen delimiter, all numbers, all uppercase letters, and so on. The user may also request additional strings to be presented. The selections are sent to the computing device 103 as user selection data 121.

The data processing application 115 then determines one or more selection patterns from the user selection data 121 by way of the pattern recognition engine 118. The pattern recognition engine 118 uses the pattern rules 130 to identify selection patterns. Some pattern rules 130 may be more specific than others and may be given a greater relative weight 139. Non-limiting examples of pattern rules 130 may include selection patterns with a quantity of selected characters, a class of selected characters (e.g., uppercase, numbers, non-letters, etc.), a relative substring position within a string, a substring in common, and so on.

The data processing application 115 then generates another user interface 120 that presents the identified selection pattern(s) to the user. This other user interface 120 may be configured to present a sample application of the identified selection pattern to another proper subset of the data set of strings which is disjoint from the previously selected proper subset. As used herein, the term "proper subset" refers to a subset of a larger set which excludes at least one element of the larger set. Two sets are "disjoint" if they include no common elements. The sample application may include an extraction of data from a corresponding one of the rows 133 represented in the other proper subset according to the selection pattern. The extraction of data may include at least a portion of a string from each of a predefined plurality of the columns 136.

To this end, the data processing application 115 may select another random subset of strings from the user data set 122. This other random subset may be disjoint from the random subset relative to which the user selections were made. The data processing application 115 then applies one or more of the identified selection pattern(s) to the strings of the other random subset, which results in highlighted, or selected, portions of the strings as rendered in the user interface 120. The user interface 120 is sent to the client 106 for rendering on the display 148.

Through the second user interface 120, the user is given an opportunity to confirm whether the identified selection pattern(s) are correct. For example, the user may select another identified selection pattern instead of the identified selection pattern selected by default. Multiple identified selection patterns may be presented for selection in ranked order according to the respective weights 139 of the pattern rules 130. The weight 139 may include a predetermined component and a dynamic component that is based at least in part on a relative confidence score associated with the identification of the pattern rule 130 by the pattern recognition engine 118.

In some cases, different selection patterns may be identified for different columns 136 of the user data set 122. The user may choose to return to the previous user interface 120 to modify his or her selections there. If the user is dissatisfied with the automatically identified selection patterns, the user may choose to enter a pattern manually, e.g., by entering a regular expression or other selection formula. In one embodiment, the pattern logic 145 for the identified patterns may be exposed to the user, which may be a starting point for manually entering a pattern.

Whether the user confirms the automatic identified and selected pattern, selects another automatically identified pattern, or enters pattern logic 145 manually may be logged as manual verification data. In various embodiments, machine learning techniques may be applied using the manual verification data. To this end, the pattern rules 130 may be modified according to whether the pattern rules 130 are being applied correctly, as determined through manual verification. The weights 139, the pattern logic 145, and/or other data may be updated as a consequence of machine learning techniques incorporated into the pattern recognition engine 118.

Subsequently, the user is able to process the user data set 122 through application of the selection patterns. In some cases, the selection patterns may be stored for future use. The processed data set may be stored in processed data 124. As a non-limiting example, the user may be a merchant participating in an electronic marketplace who is uploading a catalog of products. Each product may correspond to a row 133 having various attributes or columns 136. As part of the import catalog procedure, the user may need to create a new column 136 including an item number. Suppose that the user data set 122 includes a column 136 having an item name and item number together and separated by a pipe character. In order to process the user data set 122, the user may select the part of the field which includes the item number. The selected portion may then be recognized through the pattern recognition engine 118 and subsequently extracted and stored as a new column 136 using the data processing application 115. Several non-limiting examples of rendered user interfaces 154 will next be discussed.

Figure 2A:
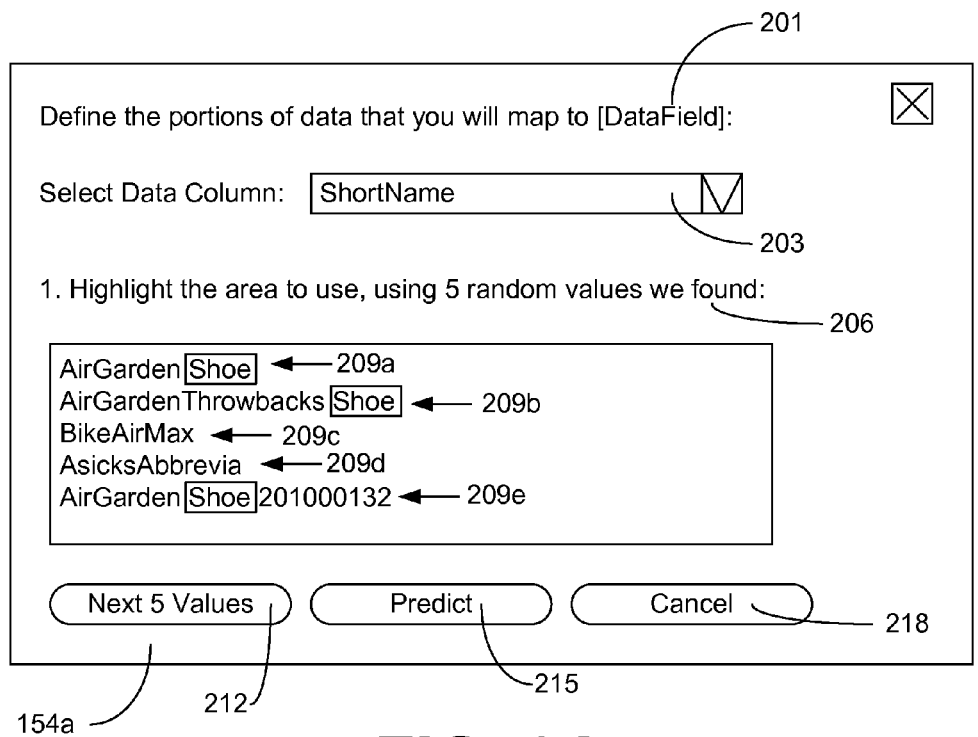
FIGS. 2A-2D are drawings of examples of user interfaces rendered by a client in the networked environment of FIG. 1 according to various embodiments of the present disclosure.

Referring next to FIG. 2A, shown is one example of a rendered user interface 154a that is rendered by the client application 151 (FIG. 1) that is executed in the client 106 (FIG. 1) in the networked environment 100 (FIG. 1). FIG. 2A presumes that a data set 119 (FIG. 1) has been previously uploaded to, or downloaded by, the data processing application 115 (FIG. 1). The rendered user interface 154a shows a title 201 that indicates that the selected portions of data will be mapped to a data field of the processed data 124 (FIG. 1) denoted as "[DataField]." Although the data set 119 employed in the example of FIG. 2A may be multi-column, the rendered user interface 154a indicates that a single data column 136 (FIG. 1) is selected. A column selection component 203 shows that the column 136 denoted "ShortName" is selected.

A selection task description 206 instructs the user to select portions from five randomly selected strings from the data set 119. The strings 209a, 209b, 209c, 209d, and 209e are, respectively, "AirGarden Shoe," "AirGardenThrowbacks Shoe," "BikeAirMax," "AsicksAbbrevia," and "AirGarden Shoe 201000132." As shown in FIG. 2A, the user has highlighted or selected portions of strings 209a, 209b, and 209e corresponding to the substring "Shoe." The user has selected no portion of the strings 209c and 209d, which do not contain the substring "Shoe." A lack of a selection may be considered as a null selection relative to the strings 209c and 209d.

The rendered user interface 154a also includes an additional string request component 212, a prediction request component 215, and a cancel component 218. The additional string request component 212 may be configured to request an additional quantity of random strings 209 from the data set 119. Such additional random strings 209 may be presented in addition to, or in place of, the strings 209a, 209b, 209c, 209d, and 209e in the rendered user interface 154a. The prediction request component 215 may be configured to submit the substring selections made relative to the strings 209 in the rendered user interface 154a to the data processing application 115 as user selection data 121 (FIG. 1). The cancel component 218 may be used to cancel the selection and to close the rendered user interface 154a.

Figure 2B:
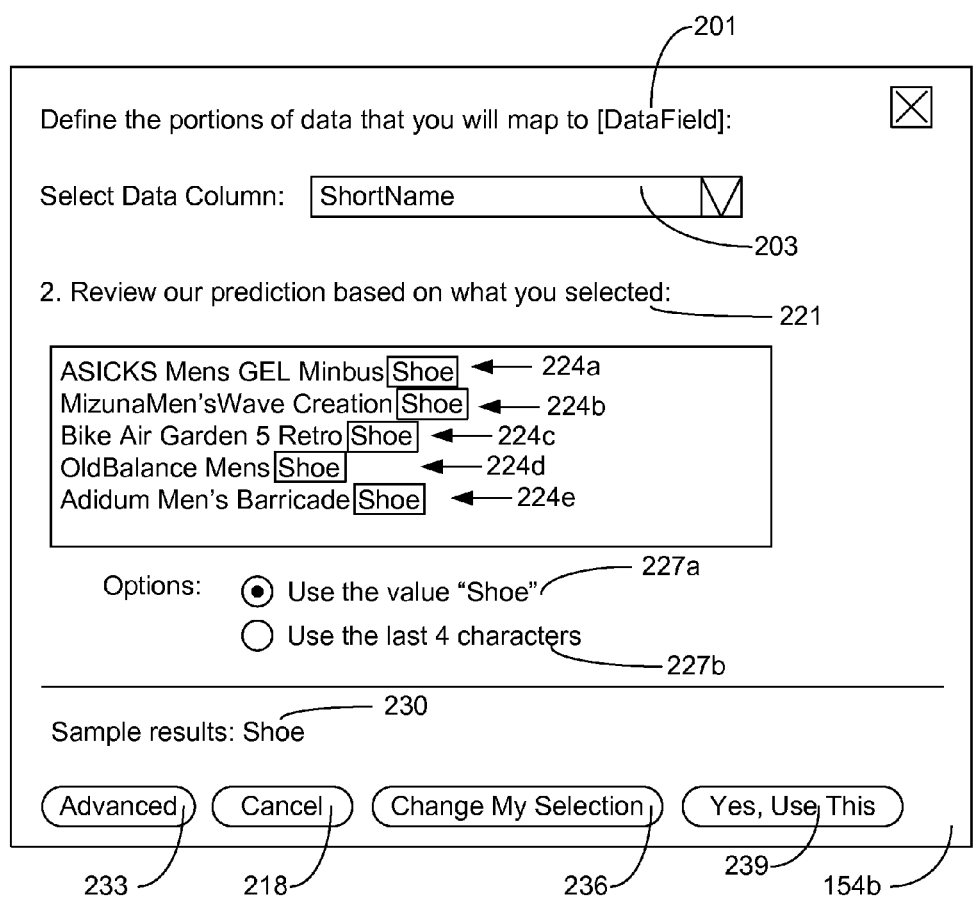

Moving on to FIG. 2B, shown is another example of a rendered user interface 154b that is rendered by the client application 151 (FIG. 1) that is executed in the client 106 (FIG. 1) in the networked environment 100 (FIG. 1). FIG. 2B indicates the result from a user selecting the prediction request component 215 from FIG. 2A. A result description 221 indicates that a pattern prediction is provided based on the selections that the user has made using the rendered user interface 154a (FIG. 2A). Accordingly, one or more pattern rules 130 (FIG. 1) have been identified in response to the user selection data 121 (FIG. 1).

The pattern rule(s) 130 have been applied to another random subset of strings selected from the data set 119 (FIG. 1). A plurality of sample pattern applications 224a, 224b, 224c, 224d, and 224e are illustrated to show the pattern rule(s) 130 being applied to select portions from such strings. Here, the randomly selected strings are "ASICKS Mens GEL Minbus Shoe," "MizunaMen's Wave Creation Shoe," "Bike Air Garden 5 Retro Shoe," "OldBalance Mens Shoe," and "Adidum Men's Barricade Shoe." In each of the sample pattern applications 224, the string "Shoe" has been highlighted in the rendered user interface 154b to indicate a pattern match.

In this non-limiting example, two potential selection patterns have been identified, and options 227a and 227b are provided to enable the user to select from the identified selection patterns. The options 227 may correspond to radio buttons, check boxes, buttons, drop-down boxes, and/or other user interface elements. Option 227a corresponds to a selection pattern having a description 142 (FIG. 1) of "the value 'Shoe.'" Option 227b corresponds to a selection pattern having a description 142 of "the last 4 characters."

The options 227 may be presented in a ranked list according to the weights 139 (FIG. 1) of the respective pattern rules 130. In one embodiment, the option 227 having the highest ranking or weight may be selected by default. For example, identical selection content (e.g., the word "Shoe") may be weighted more heavily than identical selection length and position (e.g., four characters selected at the end of a string). Accordingly, the option 227a may be preselected or otherwise presented as a default choice. A sample results field 230 may indicate the results of applying the selected pattern to extract data from the data set 119, which is, in this case, the word "Shoe."

The rendered user interface 154b also includes an advanced input component 233, a cancel component 218, a change selection component 236, and a confirmation component 239. The advanced input component 233 may be present to bring up additional user interfaces 120 (FIG. 1) for manually specifying pattern logic 145 (FIG. 1), or selection code, to be applied to the data set 119 and/or for other advanced input options relating to processing of the data set 119. The cancel component 218 may be used to cancel the data set 119 processing and to close the rendered user interface 154b. The change selection component 236 allows the user to return to the rendered user interface 154a to change the substring selections upon which the pattern identification is based. The confirmation component 239 allows the user to confirm that the identified selection pattern is correct, thereby triggering processing of the data set 119 using the identified selection pattern or rendering another user interface 120 to configure such processing.

Figure 2C:
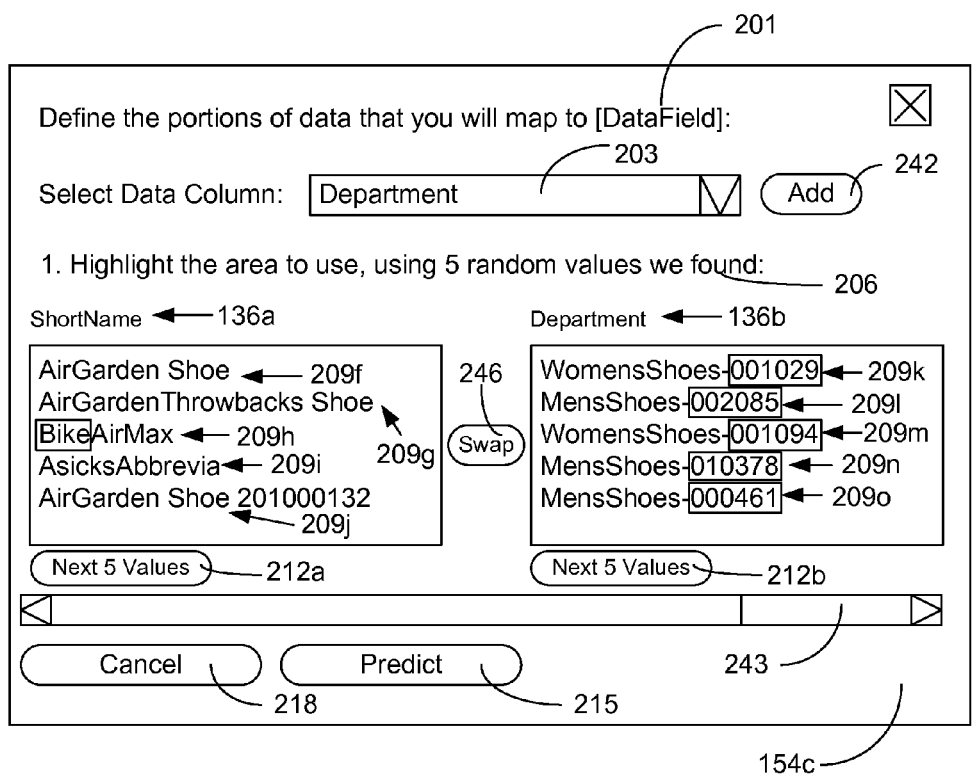

Turning now to FIG. 2C, shown is another example of a rendered user interface 154c that is rendered by the client application 151 (FIG. 1) that is executed in the client 106 (FIG. 1) in the networked environment 100 (FIG. 1). FIG. 2C presumes that a data set 119 (FIG. 1) has been previously uploaded to, or downloaded by, the data processing application 115 (FIG. 1). The rendered user interface 154c shows a title 201 that indicates that the selected portions of data will be mapped to a data field of the processed data 124 (FIG. 1) denoted as "[DataField]." Unlike the rendered user interface 154a (FIG. 2A), the rendered user interface 154c indicates that two columns 136 (FIG. 1) are selected (i.e., "ShortName" and "Department"). A column selection component 203 shows that the column 136b denoted "Department" is selected. An add column component 242 allows a user to add the selected column 136 to the rendered user interface 154c. A scroll bar 243 or other mechanism for scrolling may be employed in the rendered user interface 154c to facilitate dynamic expansion to accommodate a variable number of columns 136.

A selection task description 206 instructs the user to select portions from five randomly selected strings from the data set 119 for each of the columns 136a and 136b. The strings 209f, 209g, 209h, 209i, and 209j from the column 136a ("Short-Name") are, respectively, "AirGarden Shoe," "AirGardenThrowbacks Shoe," "BikeAirMax," "AsicksAbbrevia," and "AirGarden Shoe 201000132." The strings 209k, 209l, 209m, 209n, and 209o from the column 136b ("Department") are, respectively, "WomensShoes-001029," "MensShoes-002085," "WomensShoes-001094," "MensShoes-010378," and "MensShoes-000461."

As shown in FIG. 2C, the user has highlighted or selected a portion of string 209h corresponding to the substring "Bike." The user has selected no portion of the strings 209f, 209g, 209i, or 209j which do not contain the substring "Bike." A lack of a selection may be considered as a null selection relative to the strings 209f, 209g, 209i, and 209j. Additionally, the user has highlighted or selected portions of the strings 209k, 209l, 209m, 209n, and 209o corresponding to the last six characters of each respective string 209. An additional string request component 212a and 212b may be provided for each of the columns 136a and 136b. In one embodiment, a single additional string request component 212 may be provided in place of one for each column 136. The additional string request component 212 may be configured to request an additional quantity of random strings 209 from the data set 119. Such additional random strings 209 may be presented in addition to, or in place of, the strings 209 already present in the rendered user interface 154c. A swap component 246 may be provided to adjust the relative positioning of the columns 136, which may be significant to data processing, for example, if the extracted strings are to be concatenated as part of the processing.

The rendered user interface 154c also includes a prediction request component 215 and a cancel component 218. The prediction request component 215 may be configured to submit the substring selections made relative to the strings 209 in the rendered user interface 154c to the data processing application 115 as user selection data 121 (FIG. 1). The cancel component 218 may be used to cancel the selection and to close the rendered user interface 154c.

Figure 2D:
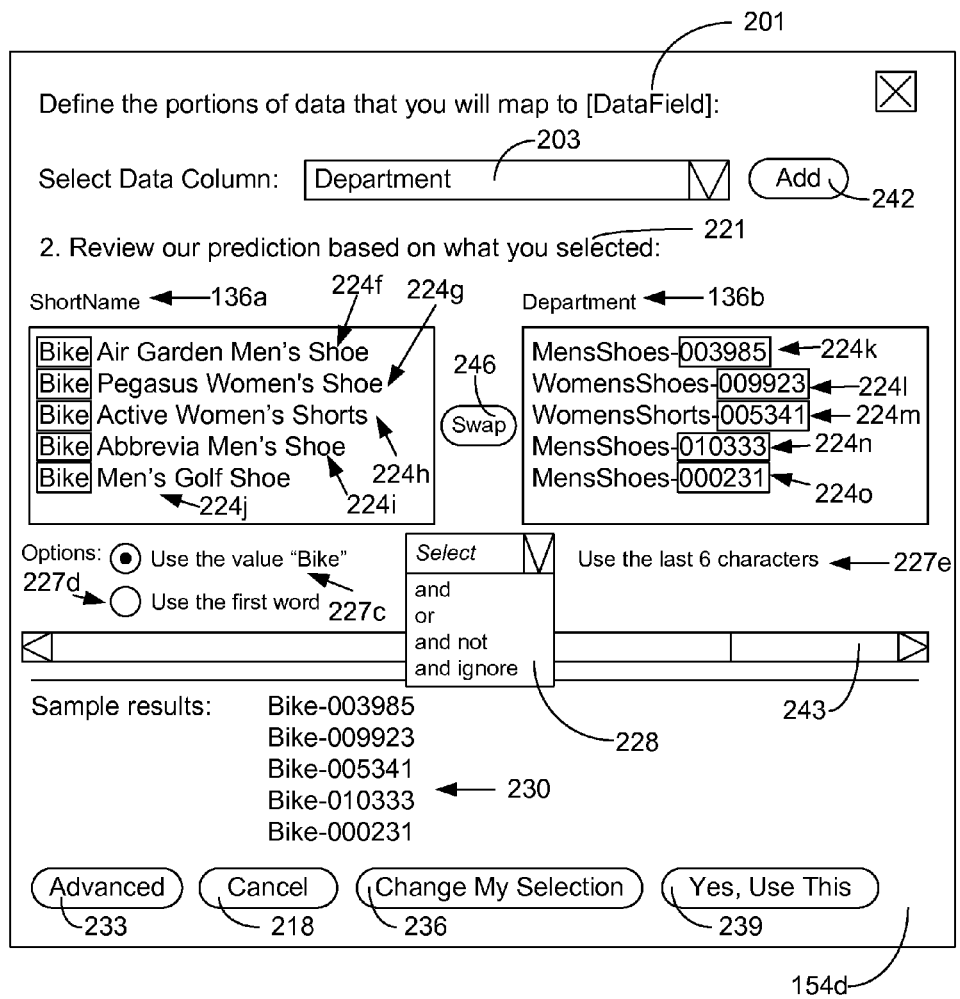

Continuing now to FIG. 2D, shown is another example of a rendered user interface 154d that is rendered by the client application 151 (FIG. 1) that is executed in the client 106 (FIG. 1) in the networked environment 100 (FIG. 1). FIG. 2D indicates the result from a user selecting the prediction request component 215 from FIG. 2C. A result description 221 indicates that a pattern prediction is provided based on the selections that the user has made using the rendered user interface 154c (FIG. 2C). Accordingly, one or more pattern rules 130 (FIG. 1) have been identified in response to the user selection data 121 (FIG. 1).

The pattern rule(s) 130 (FIG. 1) have been applied to another random subset of strings selected from the data set 119 (FIG. 1). A plurality of sample pattern applications 224f, 224g, 224h, 224i, and 224j for column 136a are illustrated to show the pattern rule(s) 130 being applied to select portions from such strings. For column 136a, the randomly selected strings are "Bike Air Garden Men's Shoe," "Bike Pegasus Women's Shoe," "Bike Active Women's Shorts," "Bike Abbrevia Men's Shoe," and "Bike Men's Golf Shoe." In each of the sample pattern applications 224 for column 136a, the string "Bike" has been highlighted in the rendered user interface 154d to indicate a pattern match.

A plurality of sample pattern applications 224k, 224l, 224m, 224n, and 224o are also shown for column 136b. For column 136b, the randomly selected strings are "MensShoes-003985," "WomensShoes-009923," "WomensShorts-005341," "MensShoes-010333," and "MensShoes-000231." In each of the sample pattern applications 224 for column 136b, the substring containing the last six characters has been highlighted in the rendered user interface 154d to indicate a pattern match.

In this non-limiting example, two potential selection patterns have been identified for the selections of column 136a, and options 227c and 227d are provided to enable the user to select from the identified selection patterns. Option 227c corresponds to a selection pattern having a description 142 (FIG. 1) of "the value 'Bike.'" Option 227d corresponds to a selection pattern having a description 142 of "the first word." By contrast, for column 136b, only one selection pattern has been identified, which is option 227e. Option 227e has a description 142 of "the last 6 characters." Because only one selection pattern has been identified for column 136b, option 227e may be rendered without a component such as a radio button, checkbox, etc.

An operator selection component 228 may be provided between the columns 136 for use in building selection rules. Examples of operators may include "and" (e.g., both left and right terms are present to select the row), "and or" (e.g., the left term and/or the right term is present to select the row), "and not" (e.g., the left term is present and the right term is not present), "and ignore" (e.g., the left term is present and the right term is ignored), and other operators. Although the operator selection component 228 is depicted as a drop-down box in FIG. 2D, the operator selection component 228 may include other user interface components in other embodiments.

A sample results field 230 may indicate the results of applying the selected patterns to extract data from the data set 119, which is, in this case, results in the strings: "Bike-003985," "Bike-009923," "Bike-005341," "Bike-010333," and "Bike-000231." In this case, the data processing result concatenates the respective extracted selections from the columns 136a and 136b in left to right order with "-" being used as a delimiter. Each result may correspond to a respective row 133 (FIG. 1) of the data set 119. It is understood that this processing is merely one non-limiting example of data processing using selection and extraction. The rendered user interface 154d may include additional components to configure the type of data processing that is employed.

The rendered user interface 154d also includes an advanced input component 233, a cancel component 218, a change selection component 236, and a confirmation component 239. The advanced input component 233 may be present to bring up additional user interfaces 120 (FIG. 1) for manually specifying pattern logic 145 (FIG. 1) to be applied to the data set 119 and/or for other advanced input options relating to processing of the data set 119. The cancel component 218 may be used to cancel the data set 119 processing and to close the rendered user interface 154d. The change selection component 236 allows the user to return to the rendered user interface 154c to change the substring selections upon which the pattern identification is based. The confirmation component 239 allows the user to confirm that the identified selection patterns are correct, thereby triggering processing of the data set 119 using the identified selection patterns or rendering another user interface 120 to configure such processing.

Figure 3A:
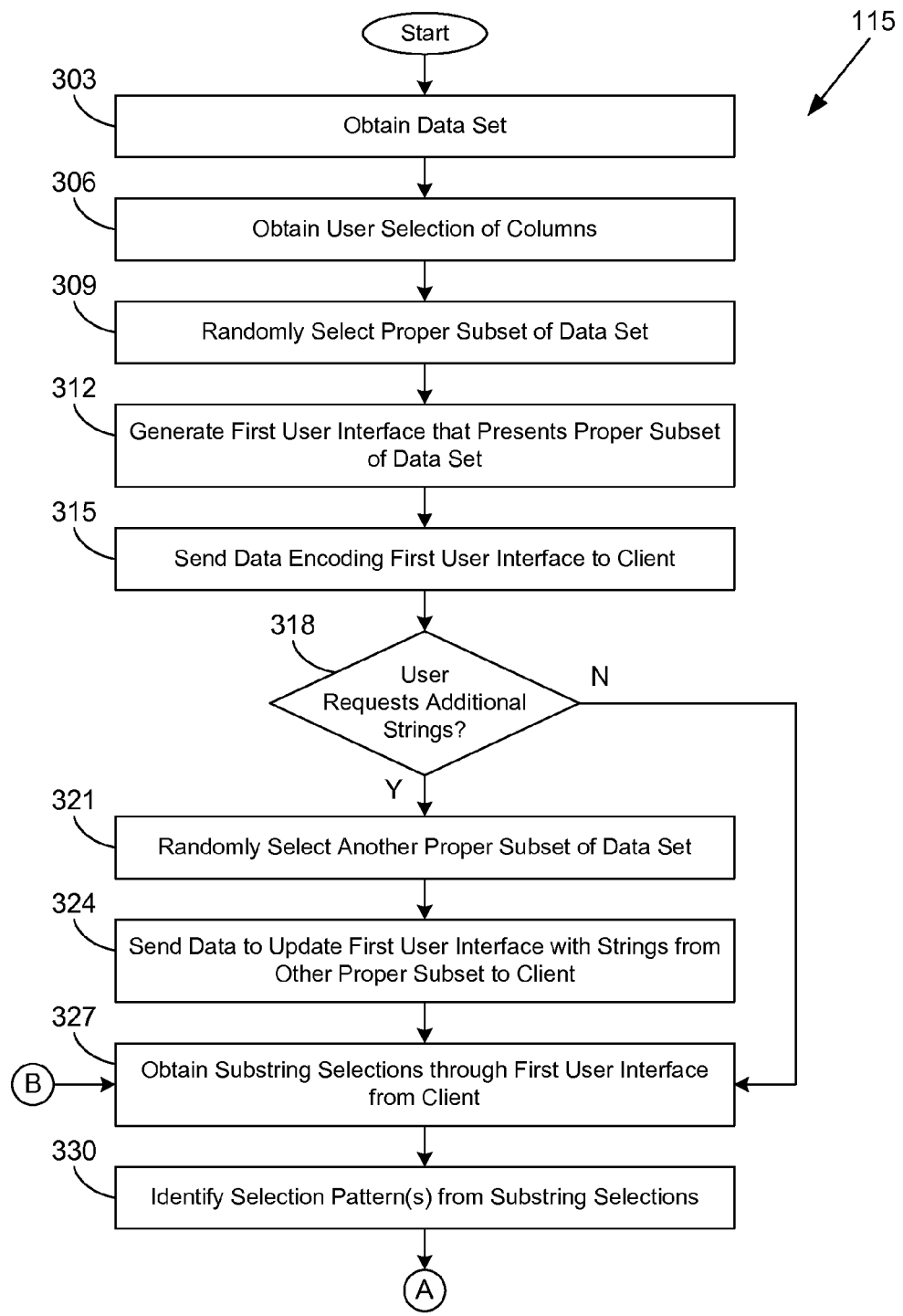
FIGS. 3A and 3B show a flowchart illustrating one example of functionality implemented as portions of a data processing application executed in a computing device in the networked environment of FIG. 1 according to various embodiments of the present disclosure.
Figure 3B:
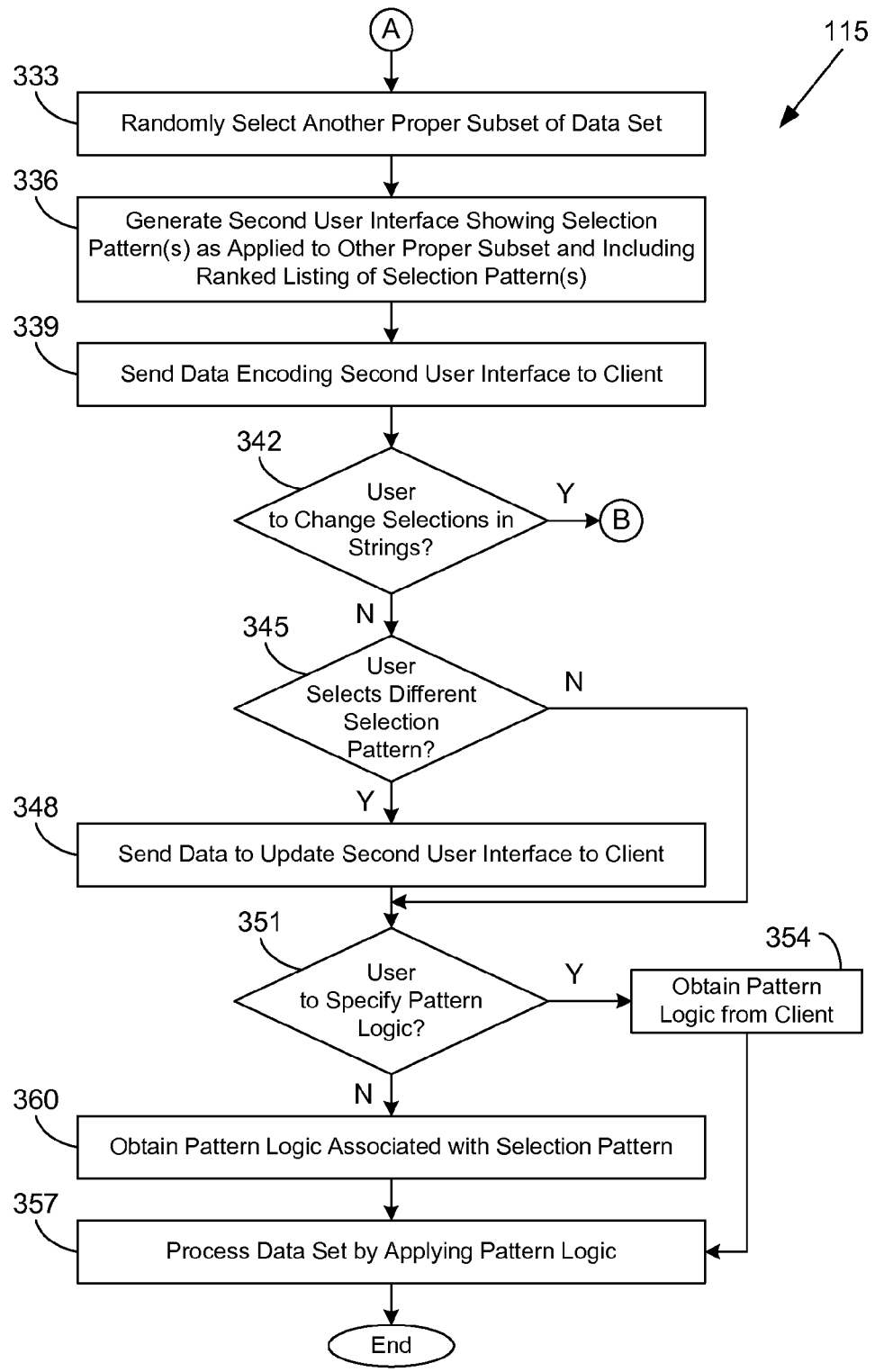

Referring next to FIGS. 3A and 3B, shown is a flowchart that provides one example of the operation of a portion of the data processing application 115 according to various embodiments. It is understood that the flowchart of FIGS. 3A and 3B provides merely an example of the many different types of functional arrangements that may be employed to implement the operation of the portion of the data processing application 115 as described herein. As an alternative, the flowchart of FIGS. 3A and 3B may be viewed as depicting an example of steps of a method implemented in the computing device 103 (FIG. 1) according to one or more embodiments.

Beginning with box 303 in FIG. 3A, the data processing application 115 obtains a data set 119 (FIG. 1). Such a data set 119 may be uploaded by a client 106 (FIG. 1) or downloaded from another computing device 103. The data set 119 is stored in the data store 112 (FIG. 1) as a user data set 122 (FIG. 1). In box 306, the data processing application 115 obtains a user selection of one or more columns 136 (FIG. 1) or attributes of the user data set 122. In some cases, one or more columns 136 may be selected by default. In box 309, the data processing application 115 randomly selects a proper subset of the user data set 122 for each of the selected columns 136. In some cases, the constituent strings of the proper subsets may correspond to the same rows 133 (FIG. 1) across multiple selected columns 136.

In box 312, the data processing application 115 generates a first user interface 120 (FIG. 1), which is configured to present the proper subset(s) of the user data set 122. In box 315, the data processing application 115 sends data that encodes the first user interface 120 (FIG. 1) to the client 106 by way of the network 109 (FIG. 1). In box 318, the data processing application 115 determines whether the user at the client 106 has requested additional strings from the user data set 122. As a non-limiting example, when five strings are presented in each proper subset, the user may request five more strings in addition to, or in place of, the earlier five strings.

If the user requests additional strings, the data processing application 115 moves to box 321 and randomly selects another proper subset of the user data set 122 for each of the selected columns 136. In box 324, the data processing application 115 sends data to the client 106 to update the first user interface 120 with the strings from the other proper subset(s). The data processing application 115 then proceeds to box 327. If the user does not request additional strings, the data processing application 115 proceeds directly to box 327 from box 318.

In box 327, the data processing application 115 obtains user selection data 121 (FIG. 1) from the client 106 embodying substring selections made by the user relative to the strings in the proper subset(s) through the first user interface 120. In box 330, the data processing application 115 invokes the pattern recognition engine 118 (FIG. 1) to identify one or more selection patterns from the substring selections using the pattern rules 130 (FIG. 1).

In box 333 of FIG. 3B, the data processing application 115 randomly selects another proper subset from the user data set 122 for each of the selected columns 136. In box 336, the data processing application 115 generates a second user interface 120, which is configured to show the identified selection pattern(s) as applied to the other proper subset(s) selected in box 333. The second user interface 120 may also be configured to include a ranked listing of the identified selection pattern(s), which may be selectable. In some scenarios, different selection patterns may be identified for each of the different selected columns 136. In box 339, the data processing application 115 sends data encoding the second user interface 120 to the client 106 by way of the network 109.

In box 342, the data processing application 115 determines whether the user is to change his or her selections of strings in the first user interface 120. If the user wishes to make a selection change, the data processing application 115 returns to box 327 of FIG. 3B. If the user does not wish to make a selection change, the data processing application 115 proceeds to box 345. In box 345, the data processing application 115 determines whether the user has selected a different one of the selection patterns. In some cases, the user may select a different selection pattern by directly specifying pattern logic 145 (FIG. 1). If the user has selected a different selection pattern, then in box 348 the data processing application 115 sends data to the client 106 for updating the second user interface 120 to reflect the change, namely, the application of the different selection pattern(s) to the other proper subsets of the user data set 122. The data processing application 115 proceeds to box 351. If the user does not select a different selection pattern in box 345, the data processing application 115 also proceeds to box 351.

In box 351, the data processing application 115 determines whether the user is to specify pattern logic 145 manually. For example, the automatically identified selection patterns may be incorrect or incomplete. If the user is to specify pattern logic 145, the data processing application 115 obtains the pattern logic 145 from the client 106 in box 354. The data processing application 115 then continues to box 357. If the user does not specify pattern logic 145, the data processing application 115 instead transitions from box 351 to box 360. In box 360, the data processing application 115 obtains pattern logic 145 associated with the identified selection pattern(s) according to the pattern rules 130 (FIG. 1). In some scenarios, the user may manually specify pattern logic 145 for one or more of the columns 136, while using the automatically determined pattern logic 145 for the other column(s) 136. The data processing application 115 then proceeds to box 357.

In box 357, the data processing application 115 processes the user data set 122 by applying the pattern logic 145 to the various selected columns 136. For example, the data processing application 115 may select various rows 133 according to the pattern logic 145, extract data according to the pattern logic 145, remove data according to the pattern logic 145, and so on. The data as processed may be stored as processed data 124 (FIG. 1) in the data store 112. Thereafter, the portion of the data processing application 115 ends.

Figure 4:
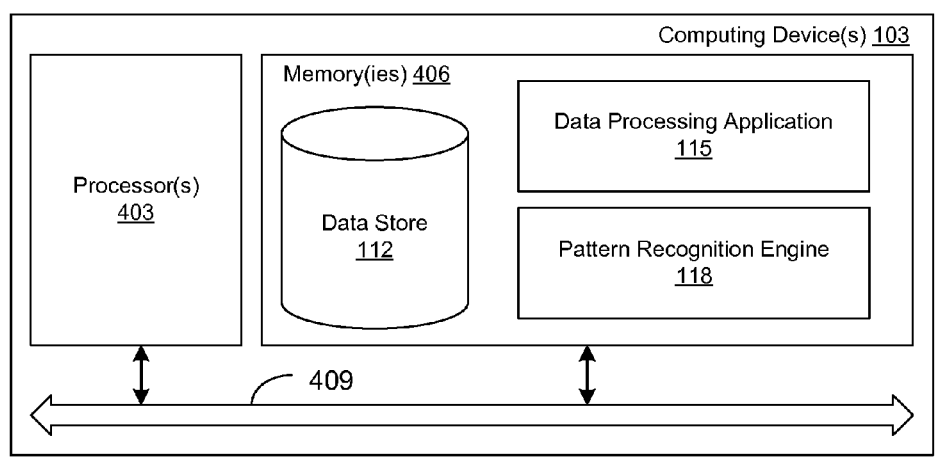
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the data processing application 115, the pattern recognition engine 118, and potentially other applications. Also stored in the memory 406 may be a data store 112 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the data processing application 115, the pattern recognition engine 118, the client application 151 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIGS. 3A and 3B show the functionality and operation of an implementation of portions of the data processing application 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIGS. 3A and 3B show a specific order of execution, it is understood that the order of execution may differ from that which is depicted. For example, the order of execution of two or more blocks may be scrambled relative to the order shown. Also, two or more blocks shown in succession in FIGS. 3A and 3B may be executed concurrently or with partial concurrence. Further, in some embodiments, one or more of the blocks shown in FIGS. 3A and 3B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the data processing application 115, the pattern recognition engine 118, and the client application 151, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
  code that, in response to receiving a data set of strings organized into a plurality of rows and a plurality of columns from a client, selects a proper subset of the data set of strings from individual rows of a randomly selected plurality of the plurality of rows corresponding to a predefined plurality of the plurality of columns for the randomly selected plurality of the plurality of rows;
  code that generates a first user interface configured to present individual strings from the proper subset of the data set of strings;
  code that sends data encoding the first user interface to the client;
  code that, in response to receiving a plurality of substring selections from the client by way of the first user interface, identifies a plurality of selection patterns based at least in part on the plurality of substring selections and a set of pattern rules, individual selections of the plurality of substring selections corresponding to individual strings of the proper subset of the data set of strings, individual selection patterns of the plurality of selection patterns being represented separately by at least two of the individual selections of the plurality of substring selections;
  code that generates a second user interface configured to present a ranked listing of the plurality of selection patterns according to a weight associated with the individual selection patterns of the plurality of selection patterns;
  code that sends data encoding the second user interface to the client; and
  code that, in response to obtaining a selection of one of the plurality of selection patterns from the client, processes the data set of strings by applying the one of the plurality of selection patterns to the data set of strings.

2. The non-transitory computer-readable medium of claim 1, wherein the first user interface and the second user interface comprise network pages.

3. The non-transitory computer-readable medium of claim 1, wherein at least one of the plurality of selection patterns includes at least one of: a quantity of selected characters, a class of selected characters, a relative substring position within a string, or a substring in common.

4. The non-transitory computer-readable medium of claim 1, wherein the second user interface is further configured to present a sample application of at least one of the plurality of selection patterns to another proper subset of the data set of strings which is disjoint from the proper subset.

5. The non-transitory computer-readable medium of claim 1, wherein the second user interface is further configured to present at least one regular expression corresponding to the individual selection patterns.

6. A system, comprising:
  at least one computing device comprising a processor and a memory; and
  at least one application executable in the at least one computing device, the at least one application comprising:
    logic that selects a proper subset of a set of strings, the set of strings being organized into a plurality of rows and a plurality of columns, the proper subset being selected from individual rows of a randomly selected set of the plurality of rows corresponding to a predefined set of the plurality of columns for the randomly selected set of the plurality of rows;
    logic that generates a first user interface that is configured to present the proper subset of the set of strings, the first user interface being further configured to obtain a plurality of substring selections, individual substring selections of the plurality of substring selections corresponding to individual strings of the proper subset of the set of strings;
    logic that identifies a plurality of selection patterns based at least in part on the plurality of substring selections and a set of rules, individual selection patterns of the plurality of selection patterns being represented separately by the individual substring selections of the plurality of substring selections;
    logic that generates a second user interface that is configured to present a ranked listing of the plurality of selection patterns according to a relative weight associated with the individual selection patterns of the plurality of selection patterns; and
    logic that processes the set of strings by applying a selected selection pattern of the plurality of selection patterns to the set of strings.

7. The system of claim 6, wherein the at least one application further comprises:
  logic that sends data encoding the first user interface to a client; and logic that, in response to obtaining the plurality of substring selections from the client, sends data encoding the second user interface to the client.

8. The system of claim 6, wherein the set of strings is organized into a table having the plurality of rows and the plurality of columns.

9. The system of claim 6, wherein the second user interface is further configured to present a result of the individual selection patterns being applied to another proper subset of the set of strings, the other proper subset being randomly selected from the set of strings and being disjoint from the proper subset.

10. The system of claim 6, wherein the second user interface is further configured to present selection code corresponding to the individual selection patterns.

11. The system of claim 10, wherein the selection code comprises a regular expression.

12. The system of claim 6, wherein the second user interface includes a component configured to cause another proper subset of the set of strings to be selected and presented in the first user interface.

13. The system of claim 6, wherein the relative weight has a predetermined component.

14. The system of claim 6, wherein the relative weight has a dynamic component indicating a relative confidence by the logic that identifies.

15. The system of claim 6, wherein at least one of the plurality of selection patterns includes a quantity of selected characters.

16. The system of claim 6, wherein at least one of the plurality of selection patterns includes a class of selected characters.

17. The system of claim 6, wherein at least one of the plurality of selection patterns includes a relative substring position within a string.

18. The system of claim 6, wherein at least one of the plurality of selection patterns includes a substring in common.

19. A method, comprising:
receiving, via at least one of one or more computing devices, a data set of strings organized into a plurality of rows and a plurality of columns;
randomly selecting, via at least one of the one or more computing devices, a proper subset of the data set of strings from at least one predefined column of the plurality of columns;
generating, via at least one of the one or more computing devices, a first user interface configured to present individual strings from the proper subset of the data set of strings;
receiving, via at least one of the one or more computing devices, a plurality of substring selections corresponding to the individual strings from the proper subset of the data set of strings by way of the first user interface;
identifying, via at least one of the one or more computing devices, a plurality of selection patterns based at least in part on the plurality of substring selections and a set of pattern rules, individual selection patterns of the plurality of selection patterns being separately represented in individual substring selections of the plurality of substring selections;
generating, via at least one of the one or more computing devices, a second user interface configured to present a ranked listing of the plurality of selection patterns according to a relative weight associated with the individual selection patterns of the plurality of selection patterns; and
processing, via at least one of the one or more computing devices, the data set of strings by applying a selected selection pattern of the plurality of selection patterns to the data set of strings.

20. The method of claim 19, further comprising receiving, in the at least one computing device, a user confirmation of the selected selection pattern.

21. The method of claim 19, wherein the second user interface is further configured to present a sample application of at least one of the plurality of selection patterns to another proper subset of the data set of strings which is disjoint from the proper subset.

22. The method of claim 21, wherein the sample application includes an extraction of data from a corresponding row of the plurality of rows represented in the other proper subset according to the at least one of the plurality of selection patterns, wherein the extraction of data includes at least a portion of a string from individual columns of the at least one predefined column of the plurality of columns.

23. The method of claim 19, wherein at least one of the plurality of selection patterns includes at least one of: a quantity of selected characters, a class of selected characters, a relative substring position within a string, or a substring in common.

* * * * *